UNITED STATES PATENT OFFICE 2,512,102

CONDENSATION PRODUCT OF SULFA-THIAZOLE AND FORMALDEHYDE

Max Hartmann and Jean Druey, Riehen, and Otto Allemann, Basel, Switzerland, assignors to Ciba Pharmaceutical Products, Inc., Summit, N. J.

No Drawing. Application November 13, 1946, Serial No. 709,426. In Switzerland November 29, 1945.

1 Claim. (Cl. 260—239.6)

Most of the new and therapeutically important sulfa-drugs are $N^1$-substituted compounds. Particularly potent among these are the compounds which contain certain heterocyclic rings in the $N^1$-position. One of the relatively more potent and less toxic of these products is sulfathiazole

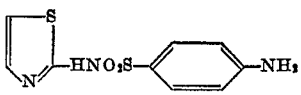

This has been found to be very useful in the treatment of coccic infections, particularly upon oral administration. Its coccic activity is, however, greatly reduced upon subcutaneous and intraperitoneal administration.

The present invention provides a new sulfathiazole derivative which is free of the aforesaid deficiency. This derivative is a condensation product of sulfathiazole and formaldehyde.

In contrast to sulfathiazole, the new substance is very active in coccic infections upon subcutaneous and intraperitoneal administration. It is especially remarkable that it exhibits a long lasting action. Thus experiments with mice which have been infected with streptococci demonstrate that on a single subcutaneous or intraperitoneal administration of 0.5 gram of the new compound per kilo of animal weight, all animals remain alive. In contrast to this with the corresponding amount of sulfathiazole under the same conditions three-fourths of the animals were dead after 10 days. Given orally, the sulfathiazole compound has furthermore valuable properties as intestinal disinfecting agent.

The new condensation product of sulfathiazole is obtained when sulfathiazole is reacted with formaldehyde. Instead of formaldehyde itself, formaldehyde-yielding materials such as paraformaldehyde or hexamethylenetetramine may be used. The reaction may be carried out advantageously in the presence of diluents such as water, dilute acids, or organic solvents as for example alcohol.

The product obtained according to the invention is thus manifestly useful as a therapeutic agent.

In the following illustrative examples of the mode of preparing the new compound according to the invention, the "parts by weight" bear the same relation to "parts by volume" as do grams to cubic centimeters.

Example 1

25 parts by weight of sulfathiazole, suspended in 250 parts by volume of 95% ethyl alcohol are treated while stirring at 75° C. with a mixture of 15 parts by volume of 40% aqueous formaldehyde and 100 parts by volume of 95% ethyl alcohol which has been previously warmed to 75° C. The resultant solution remains clear for a short time, but the condensation product very soon begins to separate out. After standing for 24 hours, the precipitate formed is collected on a Büchner funnel, washed with ethyl alcohol, dried and pulverized. The yield amounts to 27–28 parts by weight. The new compound melts at 266° C. (with decomposition).

Example 2

50 parts by weight of sulfathiazole are dissolved in 500 parts by volume of approximately normal hydrochloric acid. While stirring energetically, 24 parts by volume of 40% aqueous formaldehyde solution are dropped in. The reaction product separates out immediately in very fine form. It is separated, suitably for example by centrifuging, washed thoroughly with water and dried at 100° C. There are obtained thus 56 parts by weight of a new substance of melting point 266° C. (with decomposition).

Having thus described the invention what is claimed is:

The condensation product of sulfathiazole with formaldehyde, which is substantially insoluble in dilute mineral acid, has valuable properties as intestinal disinfecting agent, and is obtained by carrying out the condensation reaction in a diluent at a temperature not substantially in excess of 75° C.

MAX HARTMANN.
JEAN DRUEY.
OTTO ALLEMANN.

REFERENCES CITED

The following references are of record in the file of this patent:

Chem. Abstracts, vol. 40, page 3735 (1946), Citing: Collazo et al., in Farmacoterap. actual (Madrid), vol., 3, pp. 39–44 (1946).